Patented Feb. 6, 1951

2,540,785

UNITED STATES PATENT OFFICE 2,540,785

PURIFICATION OF 4-AMINOSALICYLIC ACID

Martin E. Hultquist, Bound Brook, N. J., assignor to American Cyanamid Company, New York, N. Y., a corporation of Maine No Drawing. Application December 29, 1949, Serial No. 135,831

2 Claims. (Cl. 260—525)

This invention relates to the purification of 4-aminosalicyic acid and particularly to the removal of traces of certain metals therefrom.

4-aminosalicylic acid has been used as a drug in the treatment of human tuberculosis. The dosage normally used is fairly high and therefore the purity of the compound becomes a matter of vital importance. In the past the product, as sold commercially, is described as white to light tan to brown in color. The color shows that there are impurities present, and it has been suggested that some of the toxic reactions of commercial 4-aminosalicylic acid may be due, in part at least, to the impurities represented by the brown color. The commercial production of 4-aminosalicylic acid results in a crude product which contains small amounts of iron and, sometimes, other metals. The presence of these metals, even in small traces, appears to be a major cause of darkening. The exact mechanism by which the brown color is produced has not been fully determined, but it seems reasonable that the catalytic effect of traces of iron, or other metals, in oxidation reactions may well be a factor and perhaps the main factor in causing darkening of commercial 4-aminosalicylic acid.

Iron is present in small amounts in aqueous solutions of salts of 4-aminosalicylic acid with ammonium, or alkali, or alkaline earth metals. The iron is present principally in the tri-valent or ferric form. Ordinarily, small amounts of iron can be precipitated from aqueous solutions with sodium sulfide at a pH of 6.5 to 7.5. The predominantly ferric iron compounds found associated with commercial 4-aminosalicylic acid, however, do not precipitate with sodium sulfide as would be expected. In fact, the iron comes down associated with the 4-aminosalicylic acid when the solution is acidified to a pH of 2.5-3.5.

The present invention is based on the discovery that if the iron compounds present as impurities in the 4-aminosalicylic acid are reduced to the ferrous stage, and kept in this reduced state, substantially quantitative precipitation can be effected with soluble sulfides, such as sodium, potassium and ammonium sulfides and hydrogen sulfide. It is not only necessary to reduce the small amounts of iron impurities completely to the ferrous state, but they must be maintained in reduced form until separation by precipitation and filtration is complete. If oxidation takes place, for example by contact with air, the ferrous sulfide redissolves and appears again as a contaminant when 4-aminosalicylic acid is recovered by precipitation at an acid pH.

Various reducing agents may be used. In fact, any reducing agent which does not introduce undesirable impurities may be used. Sodium hydrosulfite, however, is both cheap and effective and is therefore the preferred reducing agent. Other reducing agents, such as sodium formaldehyde sulfoxylate, etc., may also be employed.

The reducing agent should be used in slight excess so that when the iron has been precipitated as ferrous sulfide it is protected against oxidation until removed. A large excess of reducing agent is not needed, and ordinarily only sufficient excess will be used to assure complete reduction of the iron compounds present and protection against their reoxidation.

4-aminosalicylic acid, purified by the process of the present invention, is much less sensitive to darkening on exposure to air or light than is equivalent material containing traces of iron. It therefore constitutes a more desirable form of the compound for therapeutic use.

The invention will be described in greater detail in connection with the following example which is illustrative.

*Example*

1,000 parts by volume of a solution of potassium 4-aminosalicylate (about 80 parts by weight of 4-aminosalicylic acid) which contains dissolved ferric iron as a complex compound with 4-aminosalicylate, is brought to pH 6.5 to 7.5. The clear, dark, brown solution gives no appreciable precipitate with sodium sulfide, showing the stability of the ferric iron complex. Sodium hydrosulfite is added until a slight excess is present over the amount necessary to reduce ferric iron to ferrous iron. The solution becomes light brown or yellow. Sodium sulfide is now added until a slight excess is present, being sure to maintain a slight excess of sodium hydrosulfite to prevent oxidation and solubilization of the ferrous sulfide which separates immediately. On adding 8 parts activated charcoal, filtering, and precipitating the 4-aminosalicylic acid by addition of hydrochloric acid to a pH of 2.5 to 3.5, there is obtained a practically colorless product.

After filtration, washing with distilled water, and drying, the 4-aminosalicylic acid undergoes very little darkening. A sample treated in the same fashion, without removal of iron, but treated with sodium hydrosulfite and activated charcoal, darkened considerably more on drying, and tended to darken on storage in a closed, dark bottle more rapidly than the iron-free product.

I claim:

1. A process of purifying 4-aminosalicylic acid compounds containing compounds of ferric iron as impurities which comprises treating an aqueous solution of said compounds with a reducing agent capable of reducing ferric compounds to ferrous compounds, the amount of reducing agent being in excess of the stoichiometrical equivalent of the ferric iron present, precipitating the ferrous iron from the reduced iron compounds by soluble sulfides, at a pH not greatly removed from neutral, removing the precipitate and recovering 4-aminosalicylic acid from the remaining solution by acidification and filtration.

2. A process according to claim 1 in which the reducing agent is sodium hydrosulfite.

MARTIN E. HULTQUIST.

No references cited.